United States Patent
Wieczorek

(10) Patent No.: US 11,852,281 B2
(45) Date of Patent: Dec. 26, 2023

(54) ROTATING HEADER ASSEMBLY

(71) Applicant: Justin T. Wieczorek, Marietta, GA (US)

(72) Inventor: Justin T. Wieczorek, Marietta, GA (US)

(*) Notice: Subject to any disclaimer, the term of this patent is extended or adjusted under 35 U.S.C. 154(b) by 44 days.

(21) Appl. No.: 18/078,081

(22) Filed: Dec. 8, 2022

(65) Prior Publication Data
US 2023/0184369 A1 Jun. 15, 2023

Related U.S. Application Data

(60) Provisional application No. 63/287,532, filed on Dec. 9, 2021.

(51) Int. Cl.
*F16M 11/12* (2006.01)
*F16M 11/20* (2006.01)
*F16M 11/18* (2006.01)

(52) U.S. Cl.
CPC ............. *F16M 11/12* (2013.01); *F16M 11/18* (2013.01); *F16M 11/2092* (2013.01)

(58) Field of Classification Search
CPC .... F16M 11/12; F16M 11/18; F16M 11/2092; F16M 11/08; F16M 13/027; F16M 2200/024; F21V 21/14; F21V 21/26
USPC .......... 248/176.3, 324; 396/12, 428; 362/11, 362/249.1, 249.07, 249.11
See application file for complete search history.

(56) References Cited

U.S. PATENT DOCUMENTS

| | | | |
|---|---|---|---|
| 3,240,925 A * | 3/1966 | Paschke | F21V 33/0068 362/253 |
| 3,378,678 A | 4/1968 | De Groff | |
| 5,735,499 A | 4/1998 | Phillips et al. | |
| 6,575,653 B1 | 6/2003 | Krauter | |
| 6,817,585 B2 | 11/2004 | Wagner et al. | |
| 6,863,252 B2 | 3/2005 | Bosson | |
| 6,923,416 B1 * | 8/2005 | Hsieh | G10H 1/32 248/431 |
| 7,325,777 B2 | 2/2008 | Thiessen | |
| 7,594,633 B2 | 9/2009 | Carnevali | |

(Continued)

OTHER PUBLICATIONS https://www.aptp.com/technical/standard-thread-pitch-chart/ (Year: 2017).*

(Continued)

*Primary Examiner* — Christopher Garft
(74) *Attorney, Agent, or Firm* — Bold IP, PLLC; Binita Singh

(57) ABSTRACT

One or more embodiments for a rotating mounting header are adapted to connect to a single stand and provide options for connecting to a number of equipment, either type and/or amount, on a single rotating and mounting header. The rotating mounting header provides the variety of options by providing an option for including a various number of arms and/or various types of arms to connect to and extend out from a center column. The rotating mounting header comprises a center column that can accommodate a various configurations of arm mounting cylinders such that one or more arms can connect to the rotating mounting header assembly at the same time, and the one or more arms are further able to rotate simultaneously or freely move independent of another arm at the center column while also being set at a same level plane.

22 Claims, 13 Drawing Sheets

(56) References Cited

U.S. PATENT DOCUMENTS

| | | | |
|---|---|---|---|
| 8,783,973 B2 | 7/2014 | Pizzo et al. | |
| 8,936,223 B1* | 1/2015 | McGrath | F16C 11/103 248/220.21 |
| 9,022,339 B2* | 5/2015 | Borg | H02G 3/0493 248/323 |
| 9,175,803 B2 | 11/2015 | Senelier et al. | |
| 9,366,376 B2 | 6/2016 | Kamm | |
| 9,429,187 B2 | 8/2016 | Kotula et al. | |
| 10,078,255 B2 | 9/2018 | Scott | |
| 10,451,217 B2 | 10/2019 | Ravalitera et al. | |
| 2003/0026446 A1 | 2/2003 | Davis | |
| 2003/0090904 A1 | 5/2003 | Ching | |
| 2010/0172072 A1 | 7/2010 | Monaco | |
| 2011/0079697 A1* | 4/2011 | Muller | F16M 11/2064 248/323 |
| 2011/0186701 A1* | 8/2011 | Diez | A61G 12/004 248/220.21 |
| 2011/0309041 A1* | 12/2011 | Amadio | F16M 11/10 211/26 |
| 2020/0169650 A1 | 5/2020 | Fellinger et al. | |
| 2020/0306006 A1* | 10/2020 | Bellows | F21V 21/26 |

OTHER PUBLICATIONS

Wayback machine providing publication date of NPL "U" (Year: 2017).*

"Matthews Studio Equipment Baby Double Header," filmtools.com. https://www.filmtools.com/badohe4.html [Date accessed: Feb. 9, 2021].

* cited by examiner

ROTATING HEADER ASSEMBLY

CROSS-REFERENCE TO RELATED APPLICATIONS

This application is a non-provisional application which claims priority to U.S. Provisional Patent Application No. 63/287,532 filed on Dec. 9, 2021, which is incorporated by reference in its entirety.

FIELD OF THE DISCLOSURE

The present invention relates to a mounting header assembly designed to connect to photography and film equipment and rotate at an anchor bracket. The assembly described herein can be used with any type of stand used in the film and photography industry. Other mounting accessories may also benefit from the mounting header assembly described herein.

BACKGROUND

Lighting, cameras, and other equipment are necessary items in a film or photography setting. The equipment may be suspended from or connected to stands that are often positioned around a studio. Specifically, the equipment is connected to a mounting header which is connected to a stand. As such, the stands, with the connected equipment, will utilize floor space in the film or photography setting. The floor space can get crowded with multiple stands and create a hazard for tripping or bumping.

In addition to the stands, headers that connect to the equipment or accessories can be useful, however there are associated problems with the current headers. Often, the headers can be too long or too short for the desired purpose. Additionally, the current headers are not able to rotate around if repositioning of the connected equipment is required. Thus, in such situations, the stand must be physically moved, or the header may need to be repositioned to have the equipment in the appropriate position. Such a task can be cumbersome and laborious. Additionally, having to move equipment around as such also risks the equipment getting damaged by falling or bumping into another equipment or structure. As noted above, space is an issue and it would be beneficial to utilize surrounding floor space more efficiently by allowing a user to use fewer stands and thus less space taken over by stands. Additionally, having a header that can rotate also allows more flexibility to move connected equipment around without having to move the stand or readjust the header. As evident from the description, existing devices and systems for providing a connection for photography and film equipment have several problems.

Accordingly, there is still an unsolved need for mounting devices that may address these and other existing issues.

SUMMARY

An object of the invention is to remedy drawbacks by providing a device that offers the capability of mounting several pieces of equipment onto a single mounting header and is compatible with mounting onto to stands currently used in the film and photography industry.

One or more embodiments are provided below for an rotating mounting header assembly adapted to connect to a single stand and provide options for connecting to a number of equipment, either type and/or amount, on a single rotating and mounting header. The rotating mounting header assembly provides the variety of options by providing an option for including a various number of arms and/or various types of arms to a center column. The rotating mounting header assembly, which may also be referred to as a header assembly, comprises a center column and one or more telescoping arms. The center column has the capability of accommodating numerous configurations, wherein the center column can accommodate one or more arms at the same time, and the one or more arms are further able to rotate simultaneously or freely move independent of another arm at the center column.

The rotating mounting header assembly may provide several advantages. An advantage is that less space is utilized as the header assembly uses less surrounding space by including more equipment on one stand. This clears up the floor space and prevents tripping or other hazards presented by limited space. Another advantage is that the header assembly offers more flexibility to move the equipment around once the equipment is mounted to the assembly with the arms capable of rotating at the center column. Additionally, a single header assembly can hold multiple equipment pieces requiring fewer pieces to be carried to a location.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
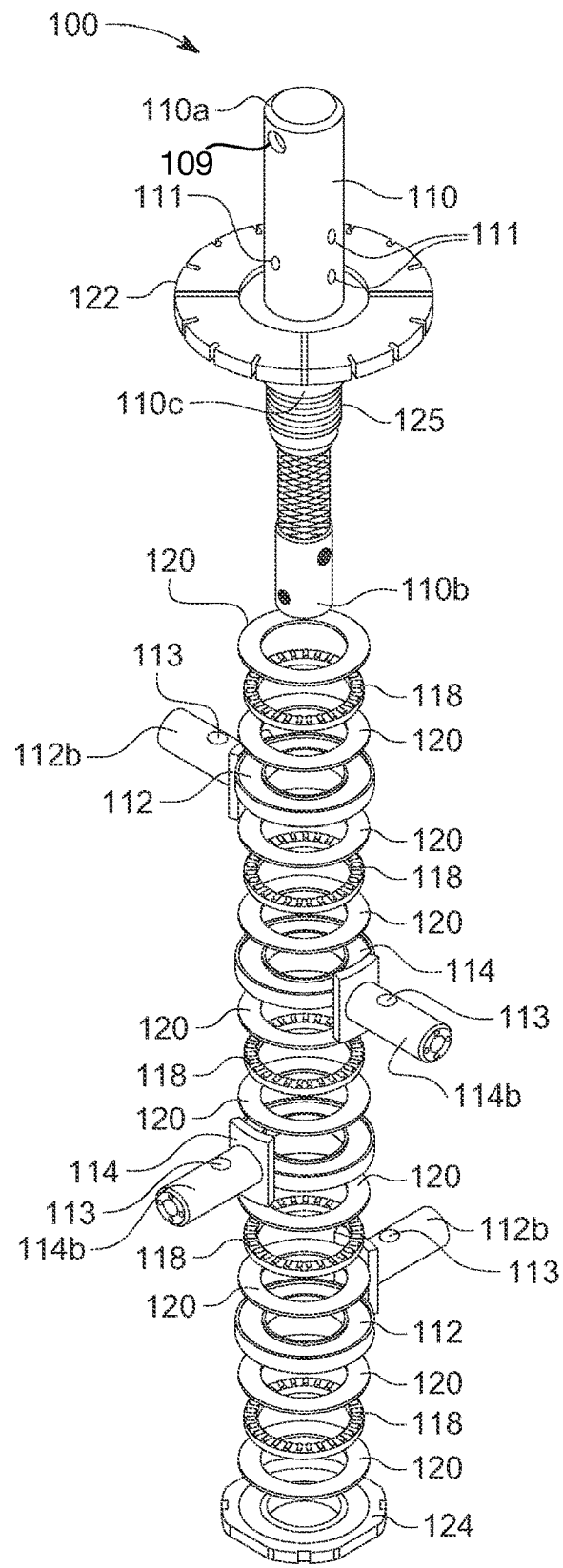
FIG. 1 is a pictorial illustration of an expanded view of a rotating mounting header assembly in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

The present disclosure is generally drawn to various embodiments for an rotating mounting header assembly. The assembly may also be referred to as a header assembly. The presently described header assembly makes it possible to include several pieces of photography and film related equipment on a single header assembly at a particular location and wherein the header assembly utilizes a single stand. The header assembly can be used on the ground paired with a stand, such as and not limited to a combo-stand, a century stand, or any other type of stand that is used in the film and photography industry or may be used in the future. It can also be used upside down to hang from a grid system, or sideways mounted to a 90 degree adapter. In addition to the use in photography and film studios, it would also be desirable to have the same practical purpose used in the mounting header assembly to be used in other industries and paired with the respective industry's mounting feature, such as an operating room for suspending medical equipment from a support structure.

Referring to the Figures, FIGS. 1 to 15 illustrate a non-limiting embodiment of an rotating mounting header assembly 100, which is an example of an assembly that can be used to mount various number and types of film and photography equipment on a single rotating mounting header assembly 100. The rotating mounting header assembly 100, which may also be referred to as a header assembly 100, may be attachable to any stand used in the film and photography studio to mount headers. As discussed above, the header assembly 100 may also be used in in other environments such as, and not limited to, operating rooms where lighting and other fixtures need to mount from a support fixture.

Figure 2:
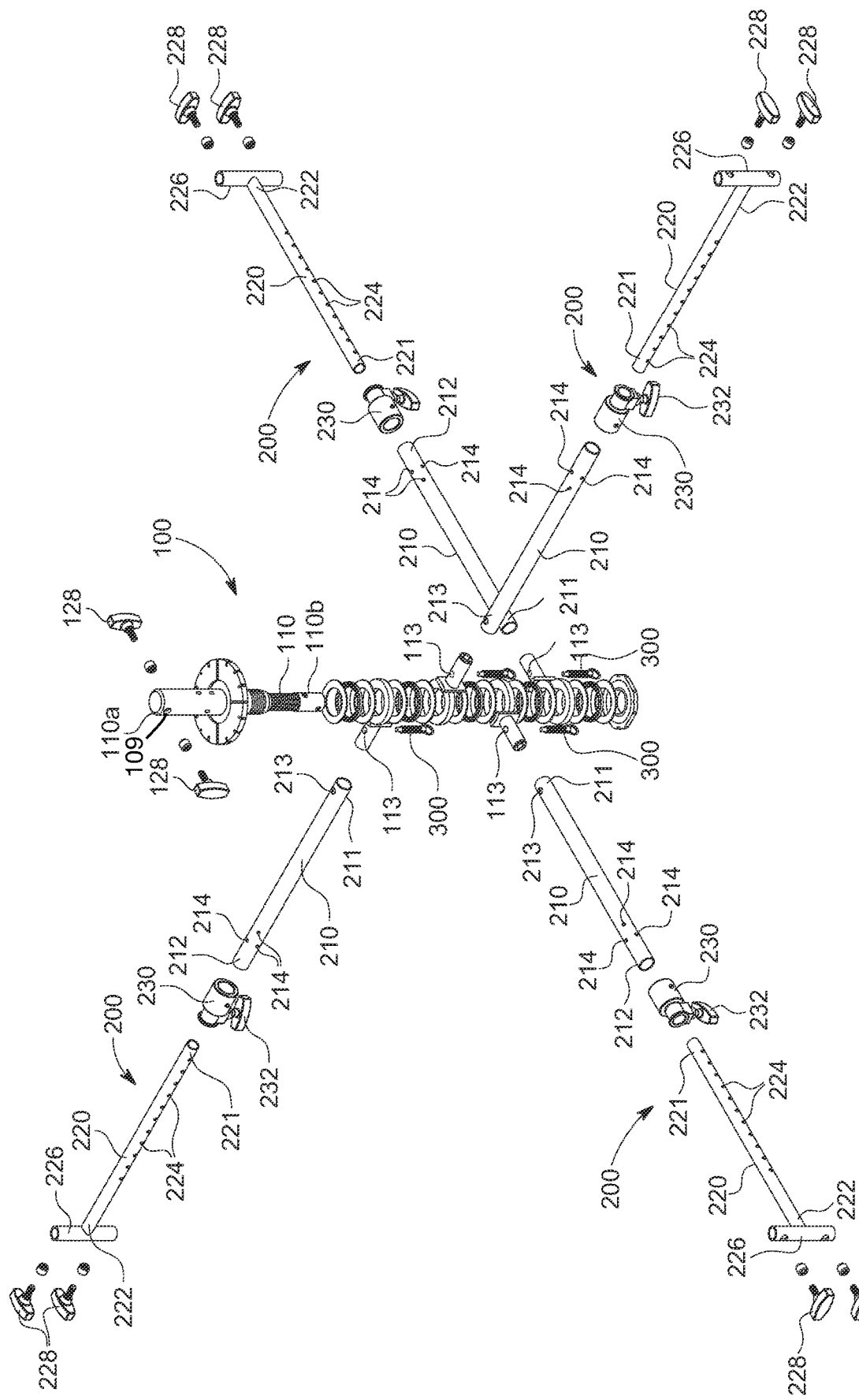
FIG. 2 is a pictorial illustration of an expanded view of a rotating mounting header assembly and one or more arms in accordance with an illustrative embodiment.
Figure 3:
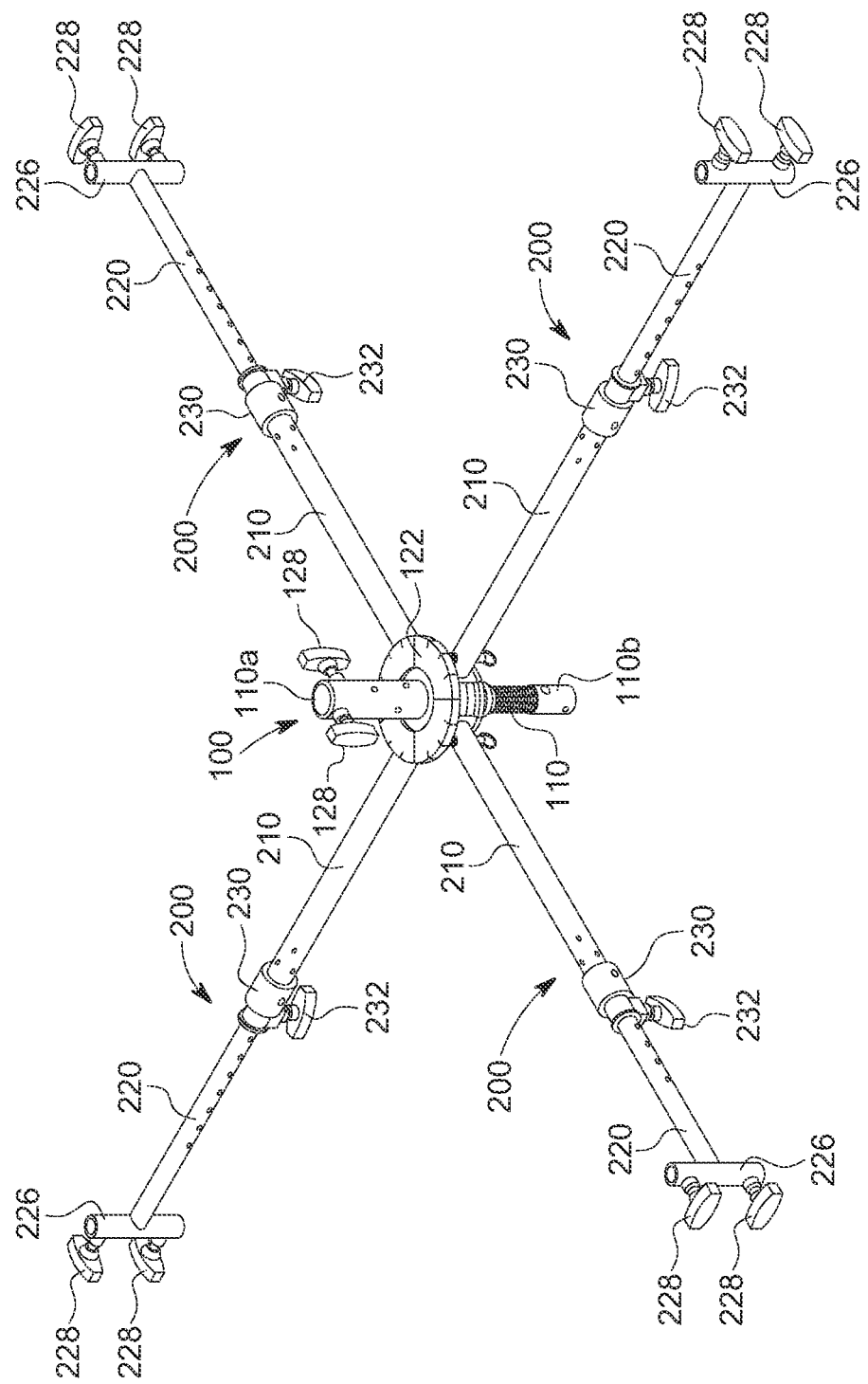
FIG. 3 is a pictorial illustration of a top perspective view of a rotating mounting header assembly connected to the one or more arms in accordance with an illustrative embodiment.
Figure 4:
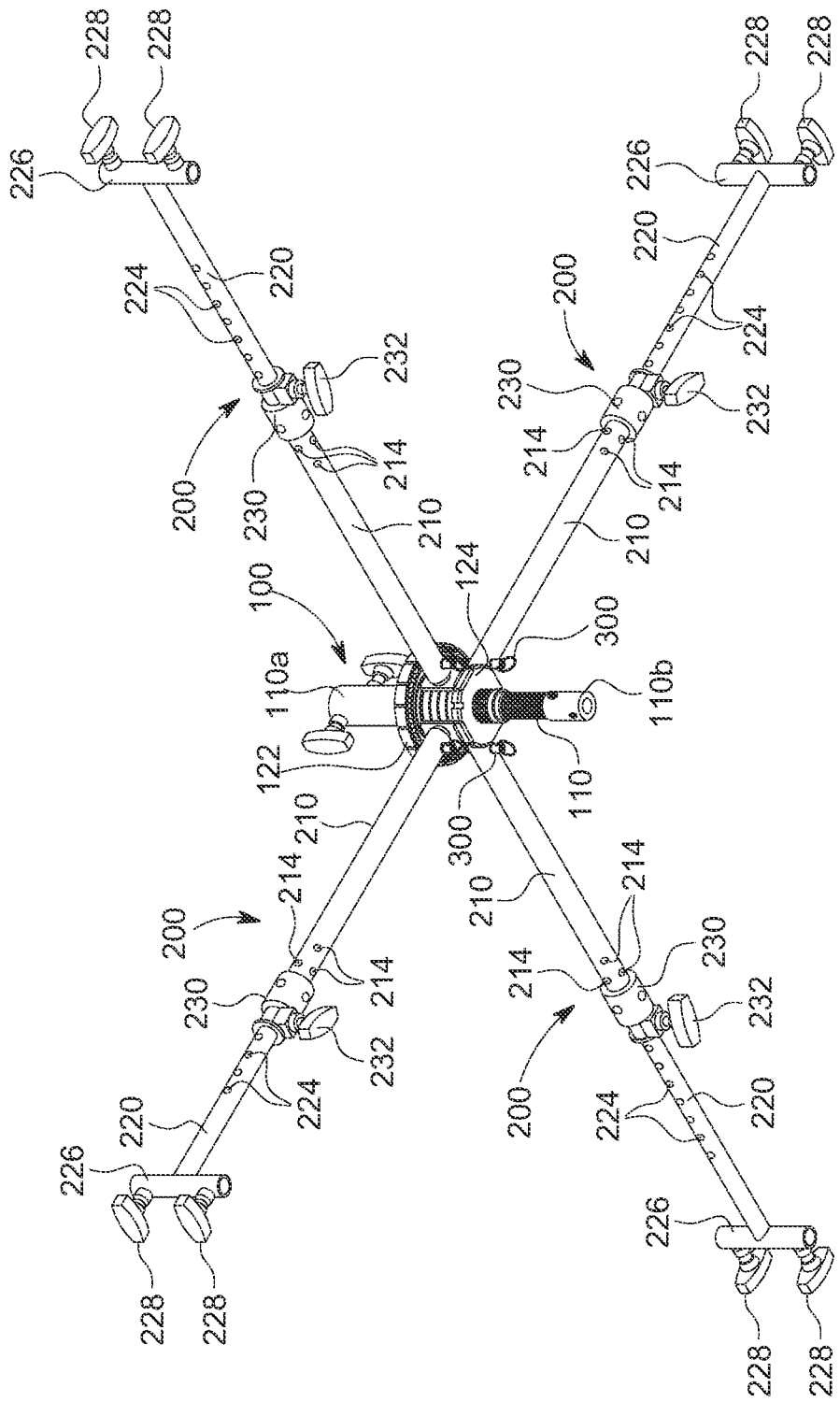
FIG. 4 a pictorial illustration of a bottom perspective view of a rotating mounting header assembly connected to the one or more arms in accordance with an illustrative embodiment.
Figure 5:
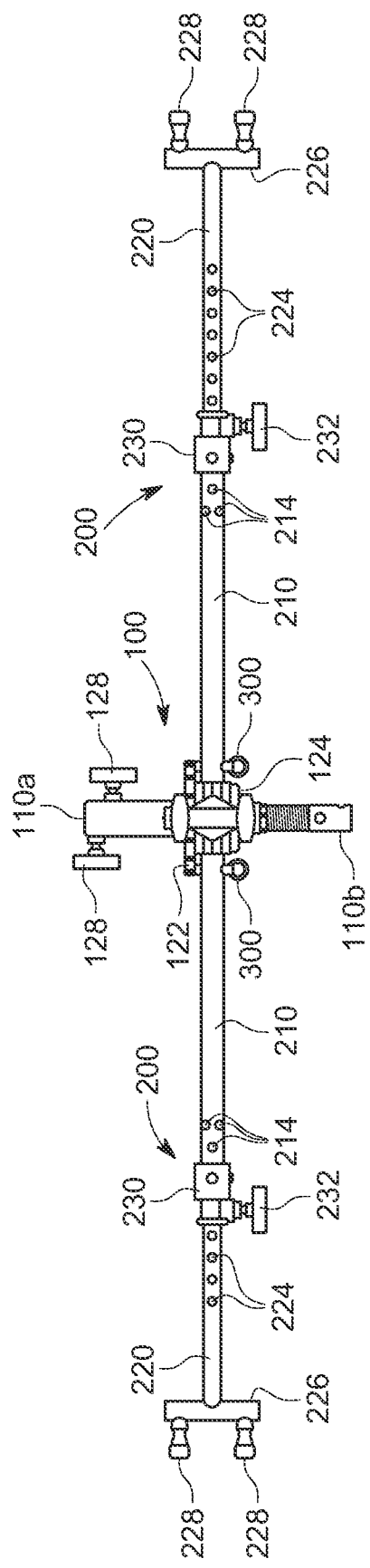
FIG. 5 is a pictorial illustration of a side view of a rotating mounting header assembly connected to the one or more arms in accordance with an illustrative embodiment.
Figure 6:
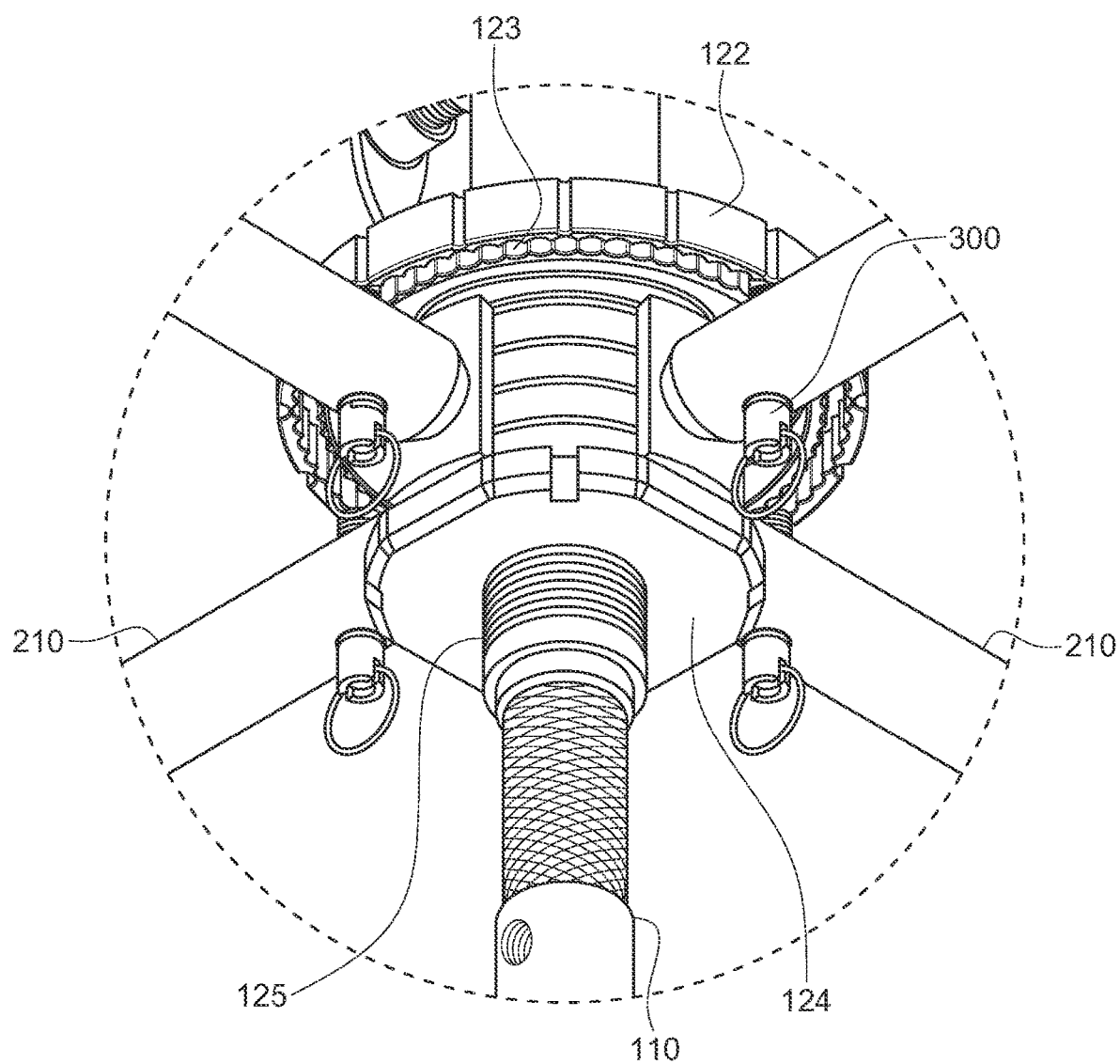
FIG. 6 is a closeup view of a section of a rotating mounting header assembly and a connection with the one or more arms in accordance with an illustrative embodiment.
Figure 7:
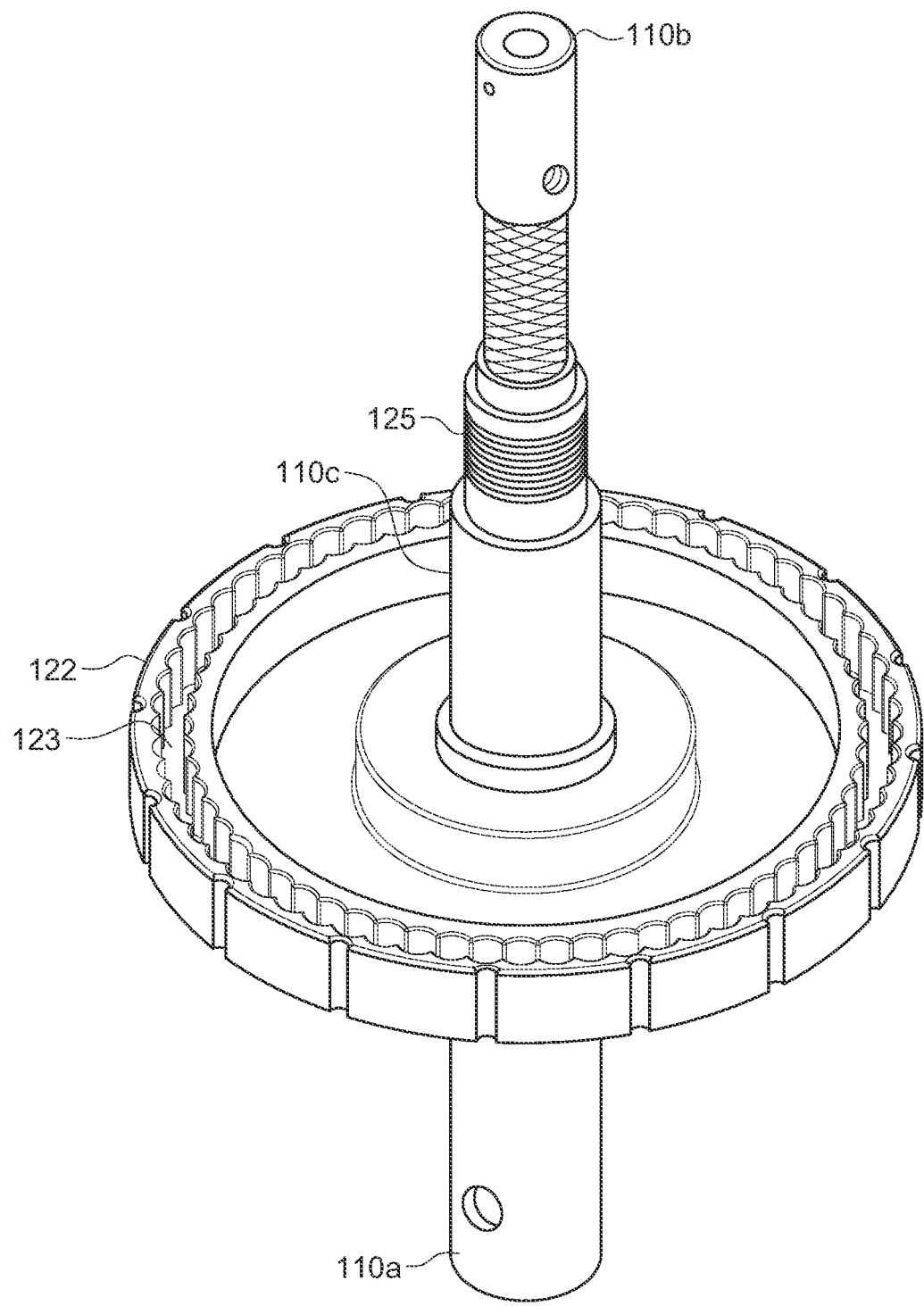
FIG. 7 is a pictorial illustration of a center column with a locking plate of a rotating mounting header assembly in accordance with an illustrative embodiment.
Figure 8:
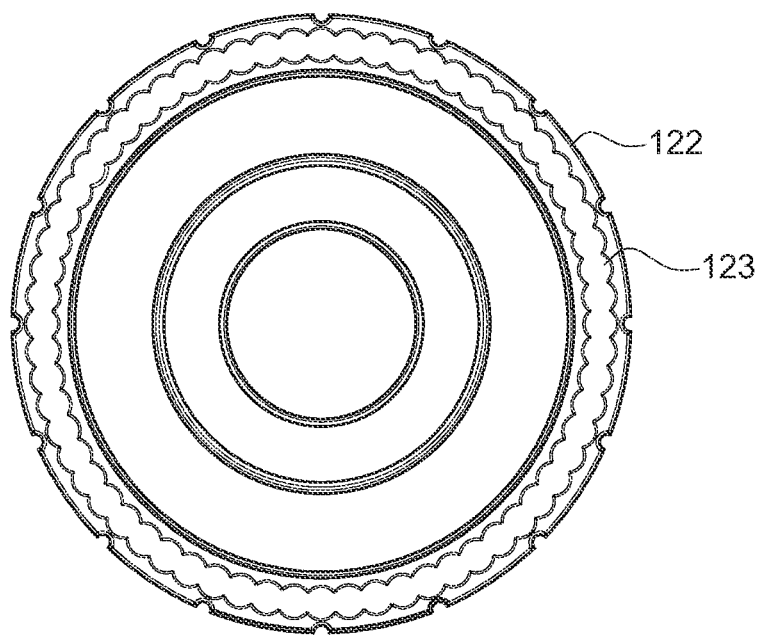
FIG. 8 is a pictorial illustration of top view of the locking plate shown in FIG. 7 in accordance with an illustrative embodiment.
Figure 11:
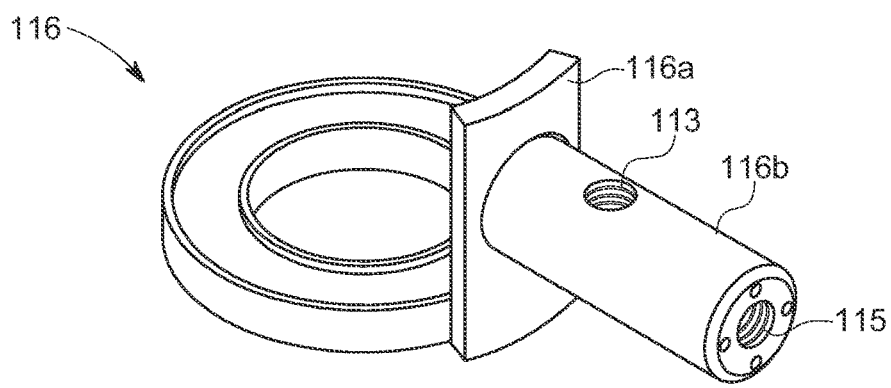
FIG. 11 is a pictorial illustration of a perspective view of a third arm mounting cylinder in accordance with an illustrative embodiment.

Referring specifically to FIGS. 1 to 6, a non-limiting embodiment of the header assembly 100 is shown in its various components. FIG. 1 illustrates an expanded view of the header assembly 100. FIG. 2 illustrates an expanded view of the header assembly 100 and one or more arms 200. FIGS. 3 to 5 illustrate the header assembly 100 connected to the one or more arms 200. FIG. 6 illustrates a close-up view of the header assembly 100. As best seen in FIG. 1, the header assembly 100 comprises a center column 110 and multiple cylindrical components that are placed onto the central column 110. The cylindrical components are configured to connect the one or more arms 200 to the header assembly 100 and wherein the cylindrical components include several variations to the configuration such that when more than one arm of the one or more arms 200 is connected to the header assembly 100, the arms 200 are all on the same level plane. As seen in the example in FIGS. 1 and 2 the variations to the cylindrical components may include a first arm mounting cylinder 112 and a second arm mounting cylinder 114. A third arm mounting cylinder 116 is shown in FIG. 11. Additionally, each of the arm mounting cylinders (112, 114), are sandwiched between bearings 118 and washers 120. The cylindrical components are called such because of their flat cylindrical appearance and will be discussed in more detail later. The arm mounting cylinders 112, 114, the bearings 118, and the washers 120 are sandwiched between a locking plate 122 and a securing plate 124 when placed onto the center column 110.

The center column 110 is tubular in shape having two ends, a first end 110a and a second end 110b. The center column 110 may have a circular cross sectional shape that conforms with a shape of standard stands used in the film and photography industry that the center column 110 can be paired with. Essentially, the center column 110 can be paired with a stand that either uses a junior receiver or a baby-pin, which includes stands such as a combo-stand, a Century Stand, or any other type of stand that uses such receivers or accessories that include those connections. The first end 110a is itself configured as a junior pin receiver, whereby it can receive or connect to a junior pin on a chosen equipment. The second end 110b of the center column 110 is configured as a junior pin whereby the second end 110b allows the center column 110 to connect with a stand having a junior receiver. The second end 110b also has a configuration that allows it to connect over a baby pin, and thus also functions as a baby pin receiver. As can be understood by the description, the second end 110b of the center column 110 can also allow connection to a first end on a center column on another header assembly, whereby two or more header assemblies may be connected to each other. As seen in FIGS. 1 and 2, the first end 110a has holes 111 that are positioned along a length of the first end 110 such that junior pins (or other type of connection ends) that are received into the first end 110a can be secured at any of those holes by a fastener. Additionally, a pair of knobs 118 also thread through a pair of staggered holes 109 to secure any accessory piece that is received through the first end 110a.

Figure 16:
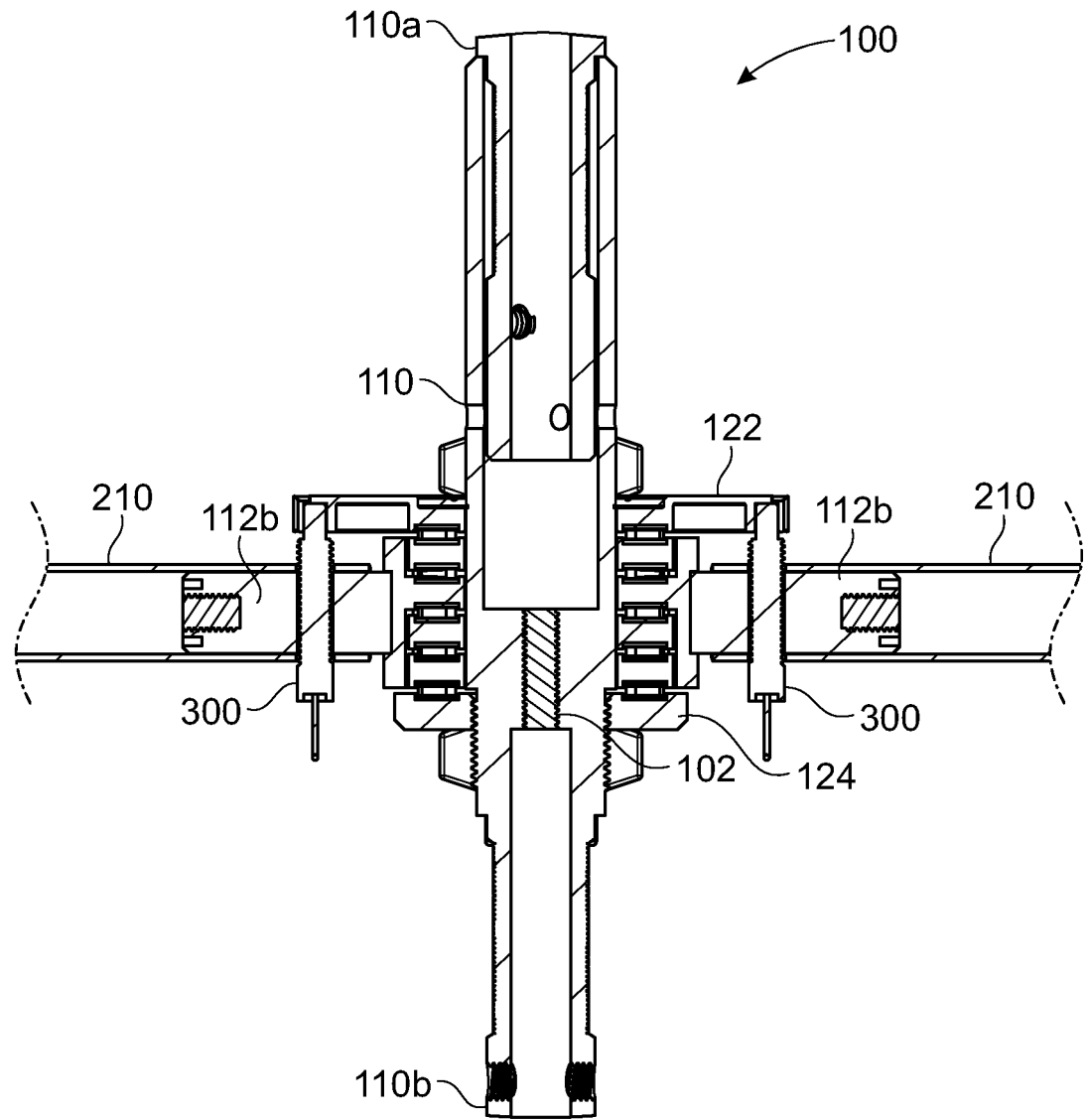
FIG. 16 is a pictorial illustration of a cross-section view of the header assembly taken along a center line.

FIG. 16 illustrates a cross-sectional view of the header assembly 100 taken along a center line. In one or more non-limiting embodiments, the header assembly 100 may include a threaded section 102 on an interior of the center column 110. The internal threaded section 102 may be relatively center of the first end 110a and the second end 110b. The internal threaded section 102 is a ⅜-16" threads (i.e., ⅜" wide with 1/16" threads). The internal threaded section 102 allows accessories that use ⅜-16" threads to be securely fastened through either the first end 110a or the bottom end 110b, utilizing the junior receiver at 110a or the baby pin receiver at 110b.

It is to be understood that the center column 110 may include the second end 110b configured to connect to stands having receivers that do not include a junior to baby pin receiver. There are adapters available in the industry that can make the connection to different types of stands and equipment with alternate connection elements possible. It is also to be understood that the center column 110 may have the first end 110a configured to connect to another center column or an equipment that does not include a junior to baby-pin. The first end 110a and the second end 110b may have a cross sectional shape other than a circle, which may include cross sectional shapes chosen from a square, a rectangle, an oval, a triangle, or a polygon.

As best seen in FIG. 6, the locking plate 122 and the securing plate 124 sandwich the cylindrical components (the arm mounting cylinders 112, 114, the bearings 118, and the washers 120) on the center column 110. The locking plate 122 is positioned closer to the first end 110a, while the securing plate 124 is closer to the opposite end, the second end 110b, with the cylindrical components between the two plates 122, 124. In the non-limiting embodiment shown in the figures, the locking plate 122 is integrated onto the center column 110 to essentially be an integral part of the center column 110. For example, the locking plate 122 may be welded onto the center column 110 to make it an integral part of the center column 110, or the locking plate may be configured as part of the center column 110 during manufacturing. In an alternate embodiment, the locking plate 122 may be an independent piece that is positioned onto the center column. The securing plate 124 is positioned onto the central column 110 and specifically screws onto the central column 110 along a threaded portion 125. There is a space 110c between the locking plate 122 and the securing plate 124 as the securing plate does not abut against the locking plate 122 wherein the space 110b is created for the cylindrical components to be positioned. The securing plate 124 can be removed from the center column by loosening along the threaded portion 125 and sliding the securing plate 124 off from the second end 110b. As such the arm mounting cylinders 112, 114, the bearings 118, and the washers 120 can be removed, added, or substituted on the central column 110 from the second end 110b.

Figure 9:
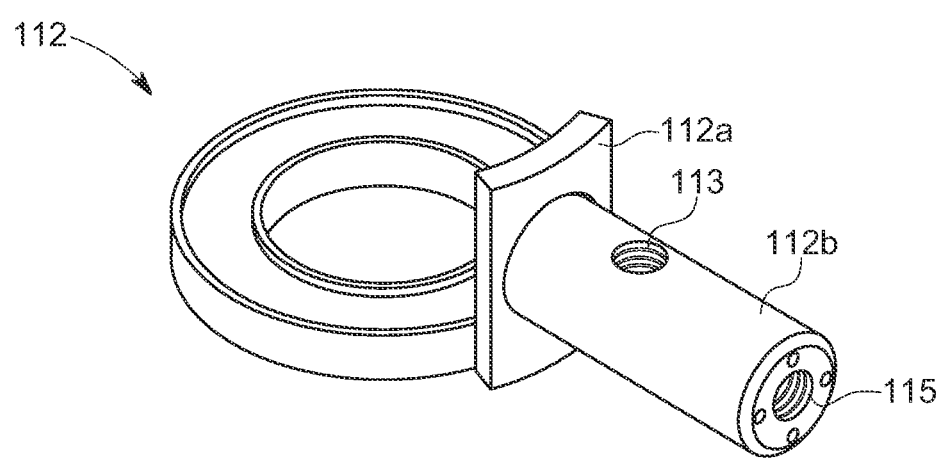
FIG. 9 is a pictorial illustration of a perspective view a first arm mounting cylinder in accordance with an illustrative embodiment.
Figure 10:
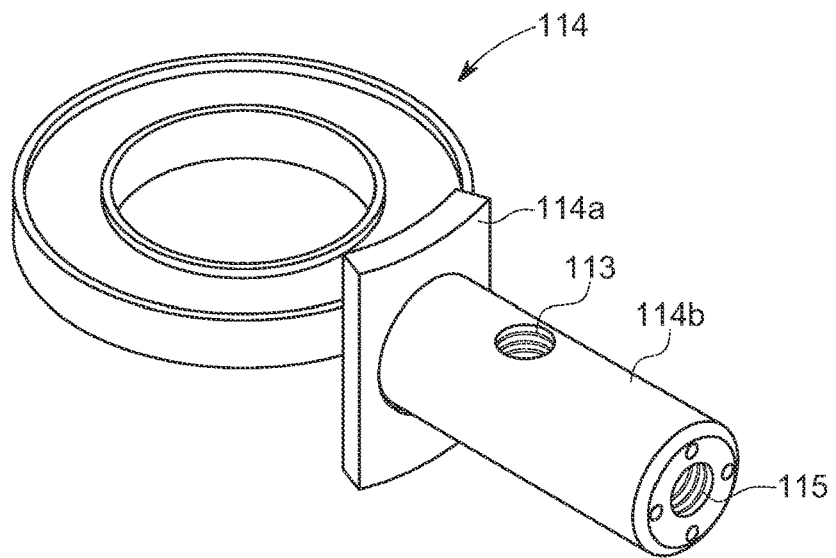
FIG. 10 is a pictorial illustration of a perspective view of a second arm mounting cylinder in accordance with an illustrative embodiment.

As mentioned above, the arm mounting cylinders 112, 114, the bearings 118, and the washers 120) are positioned on the center column 110 at the space 110c between the locking plate 122 and the securing plate 124. The cylindrical components are placed onto the center column 110 from the second end 110b and, as mentioned above, are sandwiched between the locking plate 122 and the securing plate 124. Essentially, once all the cylindrical components that can fit within the space 110c are placed onto the central column 110, the securing plate 124 is placed onto the central column 110 and tightened along the threaded portion 125 till it abuts against the cylindrical component closest to the securing plate 124. The arm mounting cylinders 112, 114, the bearings 118, and the washers 120 are tightly packed onto the center column between the locking plate 122 and the securing plate 124, such that there is not gap between the individual cylindrical components. As seen in FIGS. 9 to 11, the arm mounting cylinders 112, 114, and 116 have indentations on a top surface and a bottom surface (bottom surface not visible in the illustrations), wherein the washers 120 fit. The bearings 118 rest against the washers 120 and thus allow each arm mounting cylinder 112, 114, and 116 to rotate smoothly around the center column 110 and also independently of other each other.

As best seen in FIG. 1, each of the arm mounting cylinders 112, 114 are placed between the washers 120 and the bearings 118. Thus, each of the arm mounting cylinders 112, 114 are separated by the washers 120 and the bearings 118. This arrangement allows the arm mounting cylinders 112, 114 to move smoothly. Essentially, the arm mounting cylinders 112, 114 can rotate 360 degrees along the center column 110. Thus, the header assembly 100 provides a freely rotating arm mounting cylinders 112, 114 which are effectively connected to the one or more arms 200 (discussed later). The bearings 118 sandwiching each of the arm mounting cylinders 112, 114, allow the arm mounting cylinders 112, 114 to rotate smoothly.

FIGS. 9 to 11 illustrate various embodiments of arm mounting cylinder, which include the first arm mounting cylinder 112, the second arm mounting cylinder 114, and a third arm mounting cylinder 116, respectively. Each embodiment of the arm mounting cylinders 112, 114, 116 is configured to connect with the one or more arms 200 (discussed later). Each embodiment of the arm mounting cylinders 112, 114, 116 is configured such that when used together on the central column 110, the one or more arms 200 that are attached to the arm mounting cylinders 112, 114, 116 are all on the same level plane (see, FIG. 5 illustrating a side view of the mounting header 100 and the connected one or more arms 200). Even though the arm mounting cylinders 112, 114, 116 are stacked onto each other, with the washers 120 and the bearings 118 each one, the one or more connected arms 200 are on the same level plane.

Referring to the various embodiments in FIGS. 9 to 11, the arm mounting cylinders 112, 114, 116, have a flat cylindrical shape with an opening in a center to position onto the center column 110. Essentially the opening in the arm mounting cylinders 112, 114, 116 corresponds to the shape of the center column 110. In the embodiment shown in the figures, the arm mounting cylinders 112, 114, 116 have a circular shape with a circular opening. The circular opening allows the arm mounting cylinder 112, 114, 116 to rotate freely on the center column 110. As can be seen in the figures, each of the arm mounting cylinders 112, 114, 116 includes a panel 112*a*, 114*a*, 116*a* with an arm connector 112*b*, 114*b*, 116*b* integrated into and extending perpendicularly away from the panel 112*a*, 114*a*, 116*a*. Each of the arm connectors 112*b*, 114*b*, 116*b* may have a tubular shape or rod shape, but is not limited to those shapes. The panel 112*a*, 114*a*, 116*a* is perpendicularly set into a circumference (or perimeter) of the cylindrical shape. The panel 112*a*, 114*a*, 116*a* has a height and width, wherein the height of the panel 112*a*, 114*a*, 116*a*, is such that it traverses an entire amount of the space 110*c* on the center column, which is essentially created by the locking plate 110*a* and the securing plate 110*b*. Thus, the panels 112*a*, 114*a*, 116*a*, may abut against an inside surfaces of the locking plate 122 and the securing plate 114 when the header assembly 100 is configured fully.

Figure 12:
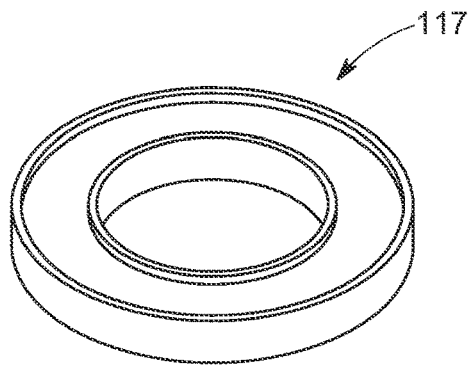
FIG. 12 is a pictorial illustration of a perspective view of a gap filler plate in accordance with an illustrative embodiment.

Each arm connector 112*b*, 114*b*, 116*b* is centered on its respective panel 112*a*, 114*a*, 116*a*. The panels 112*a*, 114*a*, 116*a* are set onto the circumference of the cylindrical portion such that the arm connectors 112*b*, 114*b*, 116*b* are on the same plane when positioned on the center column 110. As shown in FIG. 9, the panel 112*a* on the first arm mounting cylinder 112 is set into the cylindrical portion along an inside edge of the panel 112*a*, such that the entire length of the panel 112*a* extends in one direction from where it is set into the cylinder portion. In FIG. 10, the panel 114*a* on the arm mounting cylinder 114 is set slightly off center into the cylindrical portion with the length of the panel 114*a* extending longer on one side from where it is set into the cylinder portion. Lastly, in FIG. 11, the panel 116*a* is also set into the cylindrical portion along an inside edge of the panel 116*a* in a similar manner as panel 112*a*, however in this embodiment, the length of the panel 116*a* is longer than the length of the other panels 112*a*, 114*a*, which have similar lengths. FIG. 12 illustrates a cylindrical plate 117 that does not have any arm mounting features. The cylindrical plate 117 may be used to configure the header assembly 100 when less than five arms 200 are used. Essentially, the cylindrical plate 117 may be used in place of the first and second arm mounting cylinders 112, 114. One cylindrical plate 117 can replace the arm mounting cylinder 112, 114 that will not be used in a particular configuration.

The header assembly 100 can be arranged in several ways, which allows anywhere from one or more arms 200 to be connected to the header assembly 100. As seen in FIGS. 1 and 2, the header assembly 100 has been arranged to allow for four arms 200 to be connected. Starting from the locking plate 122 and going toward the securing plate 124, the arrangement is stacked as such: the first arm mounting cylinder 112, the second arm mounting cylinder 114, the second arm mounting cylinder 114, and the first arm mounting cylinder 112. The bearings 118 and the washers 120 are stacked between each arm mounting cylinder 112, 114. The bearings 118 and the washers 120 are also stacked between the locking plate 122 and first arm mounting cylinder 112, and between the securing plate 124 and first arm mounting cylinder.

The orientation of the first arm mounting cylinder 112 and the second arm mounting cylinder 114 are also important to ensure that the one or more arms 200 (when connected to the header assembly 100) will all be on the same plane. Starting from the first arm mounting cylinder 112 closer to the locking plate 122, the arm mounting cylinder is placed such that the panel 112*a* length extends toward the securing plate 124. The arrangement is flipped for the first arm mounting cylinder 112 closer to the securing plate 124, such that the panel 112*a* length extends toward the locking plate 122. The same arrangement is used for the second arm mounting plate 114. The second arm mounting cylinder 114 closer to the locking plate 122 will be positioned where the longer length of the panel 114*a* extends toward the securing plate 124. Again, the arrangement is flipped for the second arm mounting cylinder 114 closer to the securing plate 124, wherein the longer length of the panel 114*a* extends toward the locking plate 122. If the third arm mounting cylinder 116 is used, a similar arrangement as described for the first arm mounting cylinder 112 is used.

FIGS. 2 to 5 also illustrate the one or more arms 200 that mount to the header assembly 100. FIG. 2 shows the exploded view with the header assembly 100. FIGS. 3 to 5 illustrate the assembled header assembly 100 with the one or more arms 200. The one or more arms 200 connect to the arm mounting cylinders 112, 114, 116 of the header assembly 100. Specifically, the one or more arms 200 connect to the arm connectors 112*b*, 114*b*, 116*b* (arm connectors 112*b*, 114*b*, 116*b* best seen in FIGS. 9 to 11) on the arm mounting cylinders 112, 114, 116, respectively. Each of the one or more arms 200 include a fixed arm 210, a telescoping arm 220, and a connector piece 230. Each of the fixed arms 210 have a first end 211 and a second end 212, wherein the first end 211 can connect to the arm connectors 112*b*, 114*b*, 116*b* on the arm mounting cylinder 112, 114, 116.

As best seen in FIG. 2 and FIG. 6, the fixed arms 210 are connected to one of the arm mounting cylinders 112, 114 by sliding the first end 211 on the fixed arm 210 over the arm connectors 112*b*, 114*b* on the arm mounting cylinders 112, 114. The first ends 211 and the arm connectors 112*b*, 114*b* each have holes, wherein the holes 213 on the first ends 211 will align with the holes 113 on the respective arm connector 112*b*, 114*b* the first ends 211 are connected to. A plunger-type fastener 300 is threaded through the holes 113, 213 to securely connect the fixed arms 210 to the arm connectors 112*b*, 114*b* they are connected to. The plunger-type fastener 300 has a plunger end that extends into the locking plate 122, and specifically into grooves 123 that are etched into the locking plate 122 (See, FIGS. 6 to 8). When the plunger-type screw 300 is engaged with the grooves 123 in the locking plate 122, the one or more arms 200 are locked into place. Each of the one or more arms 200 has a plunger-type fastener 300 and is individually connected to the header assembly 100, and thus each of the one or more arms 200 is individually engaged with the locking plate 122. Each of the one or more arms 200 can be individually rotated with the particular arm mounting cylinder 112, 114 it is connected to by removing the plunger end on the plunger-type fastener 300 out of the groove 123 in the locking plate 122. Reinserting the plunger end of the plunger-type fastener 300 into the groove in the locking plate 122 locks the arm(s) 200 into place and prevents movement.

Referring back to FIGS. 2 to 6, the one or more arms 200 include the fixed arms 210 and the telescoping arms 220. The following description will refer to a single arm 200, however the description is relevant for all of the one or more arms 200 as they are all alike. The second end 212 of the fixed arm 210 connects to a first end 221 of the telescoping arm 220. The connection is secured by a connector piece 230 which goes over the second end 212 of the fixed arm 210 and allows the first end 221 of the telescoping arm 220 to be inserted through the connector piece 230 into the fixed arm 210. The connector piece 230 has a threaded knob 232 that can secure the telescoping arm 220 into position.

The fixed arm 210 has a set of holes 214 near the second end 212 that are set slightly apart from each. The set of holes 214 may be at the top and bottom and left and right. Additionally, there are also a set of holes at 45 degrees from the set of holes at the top, bottom, left and right. The set of holes 214 are aligned to allow a pin to slide in from one hole and traverse straight into an opposite hole. As shown in FIG. 2, the telescoping arm 220 has a plurality of holes 224 in line on a left and right which allows a pin to slide in. Thus, once the telescoping arm 220 is inserted into the fixed arm 210, the plurality of holes 224 are aligned with a set of holes 214 such that the pin is inserted through the set of holes 214 and a hole from the plurality of holes 224 to secure the telescoping arm 220 into a position. The telescoping arms 220 can be extended or retracted by loosening and tightening the knob 232 on the connector piece 230 and by removing and inserting the pin from the set of holes 214 and a hole of the plurality of holes 224 on the telescoping arm 220.

In the embodiment shown in FIGS. 2 to 5, a second end 222 of each telescoping arm 220 has a perpendicularly set double receiver piece 226 (e.g., female ⅝" receiver) with two locking knobs 228 to allow two different attachments to connect onto the receiver piece 226. The attachments may include equipment needed on a set/studio such as, and not limited to, cameras, lighting, monitors, etc. The set of holes 214 on the fixed arm 210 are set approximately 45 degrees apart from each other, which allows the telescoping arms 220 to rotate within the fixed arm 210 and to lock the telescoping arm 220 at one of those set of holes 214 and having the receiver piece 226 rotated and locked at the desired angle in 45 degree increments. It is to be understood that different incremental angular changes can also be accommodated in alternate embodiments.

Figure 13:
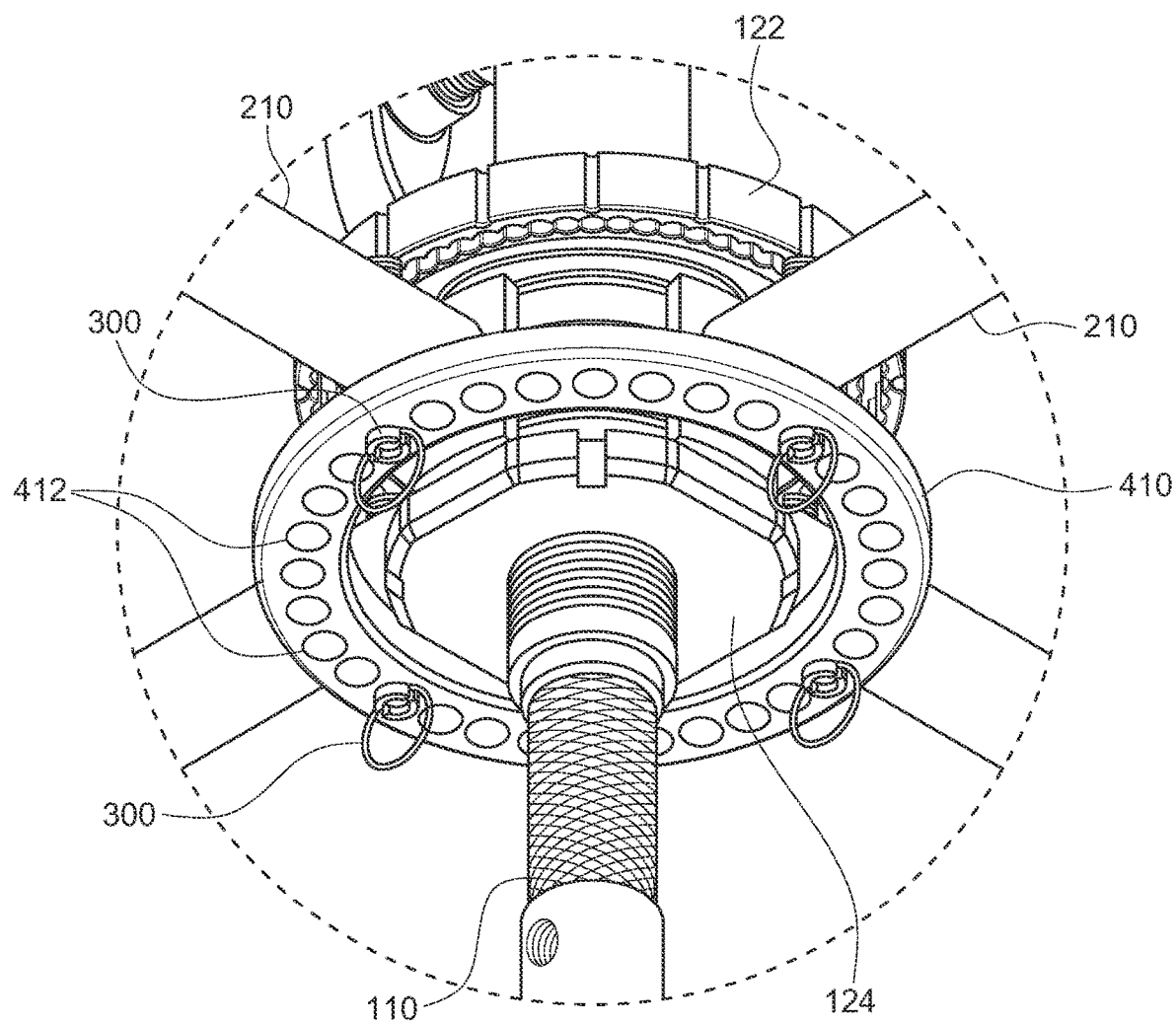
FIG. 13 is a pictorial illustration of a first accessory that permits all of the one or more arms connected to a rotating mounting header assembly to move simultaneously in accordance with an illustrative embodiment.
Figure 14:
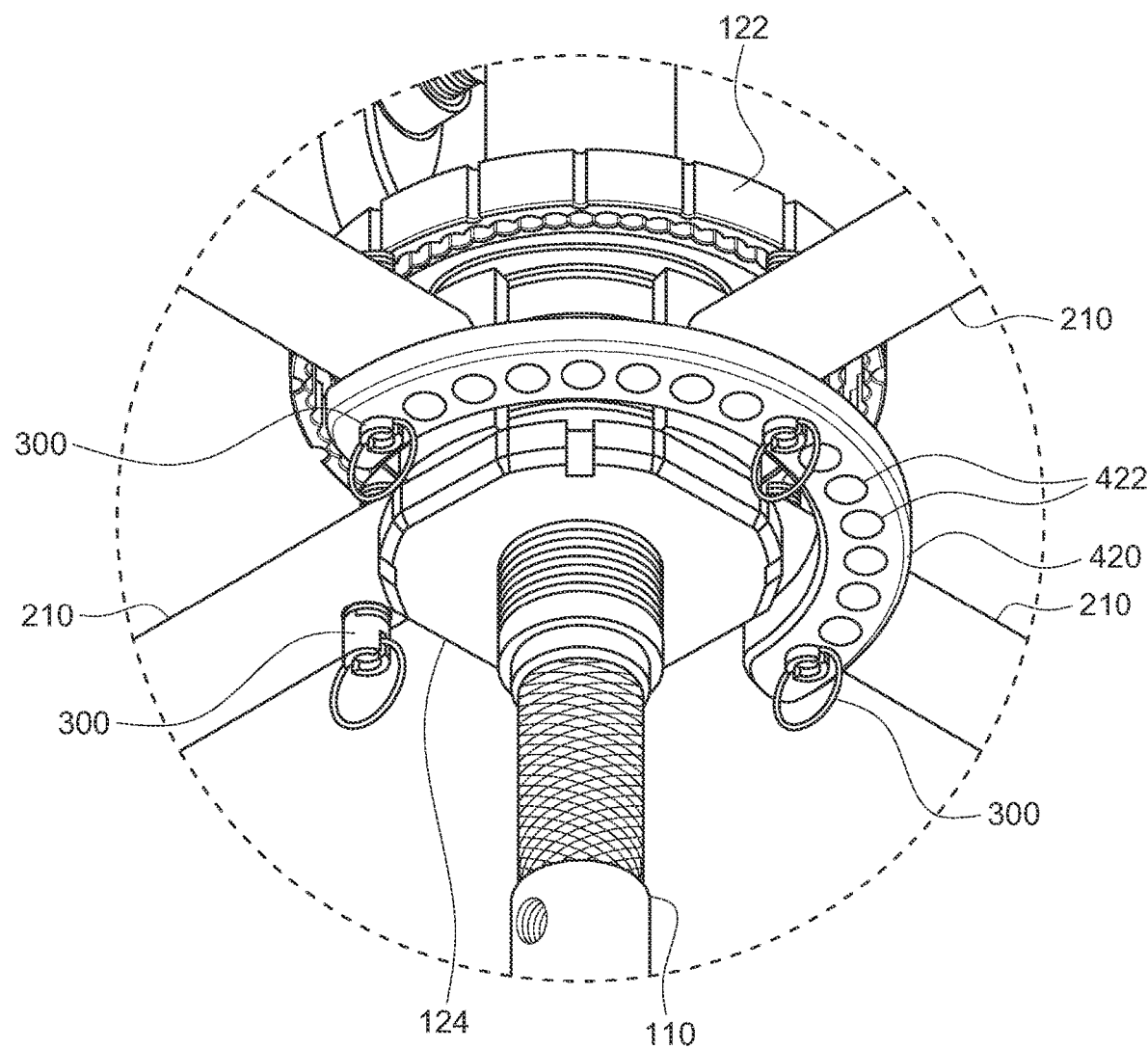
FIG. 14 is a pictorial illustration of a second accessory that permits three of the one or more arms connected to a rotating mounting header assembly to move simultaneously in accordance with an illustrative embodiment.
Figure 15:
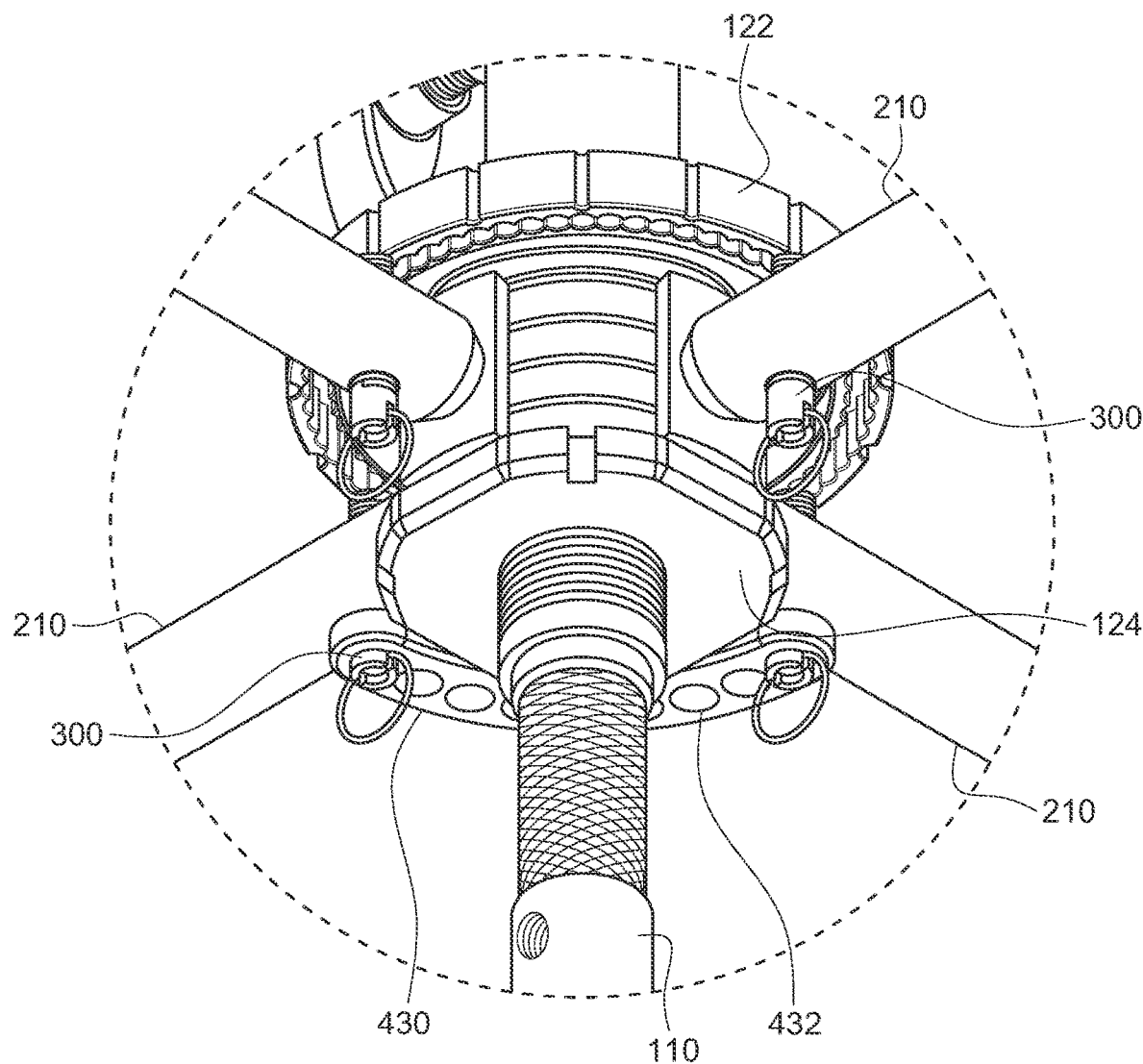
FIG. 15 is a pictorial illustration of a third accessory that permits two of the one or more arms connected to a rotating mounting header assembly to move simultaneously in accordance with an illustrative embodiment.

FIGS. 13 to 15 illustrate accessory pieces that can connect to the one or more arms 200 with the plunger-type pin 300. At times, it may be desired that two or more arms spin/rotate simultaneously. FIG. 13 illustrates a circular accessory piece 410. The illustration shows that the circular accessory piece 410 is a full circle having a plurality of evenly spaced openings 412 around a circumference. FIG. 14 illustrates a half circle accessory piece 420, which is designed as a half circle, and also having a plurality of evenly spaced openings 422 around a perimeter. Lastly, FIG. 15 illustrates a quarter circle accessory piece 430, which is essentially a quarter circle shaped piece having a plurality of evenly spaced openings 432 around a perimeter. Depending on how the one or more arms 200 are arranged around the center column 110, the number of arms 200 that are used, and the desired number of arms 200 that need to be moved simultaneously while maintaining the same distance between them, the appropriate accessory piece 410, 420, 430 will be selected to lock the desired number of arms. For example, in FIG. 13, the fours arms 200 are arranged as part of the header assembly 100, and all the arms 200 are placed equidistantly and desired to move simultaneously. Thus, the circular accessory piece 410 is used to lock all arms at that set distance so they can move simultaneously and maintain the distance between each arm 200. Looking at the example in FIG. 14, the half circle accessory piece 420 is being used to lock three arms 200 together into a set position, while a fourth arm 200 is not locked together with the other, thus while the three locked arms 200 can move simultaneously, the fourth arms will have to be individually moved.

The accessory pieces 410, 420, 430 may be attached to the header assembly by removing the plunger-type fastener 300 by unscrewing from the fixed arms 210 of the one or more arms 200 that will be connected and spun together. The accessory piece 410, 420, 430 can be placed under the fixed arms 210 after adjusting the spacing desired between the one or more arms 200. Once the adjustment is made, the plunger type fastener 300 can be inserted through the particular opening 412, 422, 432 that aligns with the opening 213 in the fixed arm 210. The plunger type pin 300 will eventually traverse through the opening 113 in the arm connector cylinder (112 and 114) into a groove 123 in the locking plate 122.

Accordingly, the present description provides for various embodiments for a header assembly that has the possibility of being configured in various ways to be used in film and motion pictures in addition to home and studio photography and videography. Many uses and advantages are offered by the header assembly as described above in one or more non-limiting embodiments. The header assembly may be relatively compact and portable, whereby making it extremely useful in conveniently setting up multiple pieces of equipment onto one header assembly. Many additional advantages and uses are offered by the one or more systems described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:
1. A header assembly for mounting accessories, the header assembly comprising:
  a center column having a first end and a second end, wherein the first end and the second end are each configured to mount an equipment having a receiving pin or mount the header assembly to an equipment configured to receive a receiving pin;
a locking plate positioned around the center column proximal to the first end;
a securing plate positioned around the center column proximal to the second end, and whereby the locking plate and the securing plate are spaced apart creating a space;
one or more arm mounting cylinders positioned on the center column in the space between the locking plate and the securing plate, wherein the one or more arm mounting cylinders are secured onto the center column by the locking plate and the securing plate, wherein each of the one or more arm mounting cylinders has a cylindrical shape and includes:
a panel perpendicularly set onto a perimeter of the cylindrical shape, wherein the panel has a length and a width; and
an arm connector integrated into the panel to extend perpendicularly away from the panel, and wherein the arm connector has a tubular shape with an opening that traverses through the arm connector; and
whereby each of the one or more arm mounting cylinders is configured to connect to one or more arms configured to mount to accessories or whereby the one or more arm mounting cylinders can directly connect with an accessory.

2. The header assembly of claim 1, wherein an interior of the center column includes a threaded section at a relative midline of the center column.

3. The header assembly of claim 1, wherein the locking plate is integrated to the center column.

4. The header assembly of claim 1, wherein the securing plate secures the one or more arm mounting cylinders onto the center column, wherein the securing plate is removable from the center column by sliding off from the second end, whereby allowing the one or more arm mounting cylinders to be placed onto or removed from the center column from the second end.

5. The header assembly of claim 1, wherein each of the one or more arm mounting cylinders is sandwiched between bearings, whereby each of the one or more arm mounting cylinders rotate independently of each other.

6. The header assembly of claim 1, wherein each of the one or more arm mounting cylinders has an opening in a center corresponding with a cross-sectional shape and size of a space on the center column.

7. The header assembly of claim 1, wherein at least three configurations of the one or more arm mounting cylinders comprises:
a first arm mounting cylinder wherein the panel is set onto the perimeter of the cylindrical shape along an inside edge of the panel wherein an entire length of the panel extends in one direction from where it is set into the cylindrical shape;
a second arm mounting cylinder, wherein a length of the panel is the same as the length of the panel on the first arm mounting cylinder, wherein the panel on the second arm mounting cylinder is set off center onto the perimeter of the cylindrical shape wherein the length of the panel extends in both directions from where the panel is set onto the cylindrical shape, with one direction having a longer length of the panel; and
a third arm mounting cylinder wherein the panel has a length that is longer than the length of the panel of the first and second arm mounting cylinders, and wherein the panel on the third mounting cylinder is set onto the perimeter of the cylindrical shape along an inside edge of the panel wherein an entire length of the panel extends in one direction from where it is set onto the cylindrical shape.

8. The header assembly of claim 1, wherein the one or more arm mounting cylinders are stacked onto the center column such that the arm connectors on each arm mounting cylinder extends perpendicularly away from the center column, and wherein the one or more arm connectors are all arranged on a similar level plane.

9. The header assembly of claim 1, wherein the one or more arms connect to an arm connector of the one or more arm connectors on one of the one or more arm mounting cylinders, wherein each of the one or more arms includes a fixed arm, a telescoping arm which slidingly fits within the fixed arm, and a connector piece that fixedly connects the fixed arm and the telescoping arm, whereby the telescoping arm can extend and retract within the fixed arm by loosening the connector piece.

10. The header assembly of claim 9, wherein an opening traverses through the fixed arm at a position proximal to a first end of the fixed arm, wherein the first end of the fixed arm is fitted over an arm connector of the one or more arm connectors and the opening in the fixed arm aligns with the opening in the arm connector, wherein:
a plunger-type fastener is threaded through the openings in the fixed arm and the arm connector and a plunger tip on the plunger-type fastener is inserted into a groove among a plurality of grooves configured into the locking plate to lock the one or more arms into place; and
wherein the plunger-type fastener can be moved out of the groove in the locking plate such that the fixed arm is unlocked and can rotate around the center column.

11. The header assembly of claim 9, wherein the one or more arms further comprises:
a set of holes located proximally to a second end of the fixed arm, wherein each hole of the set of holes are opposite each other such that a pin can traverse through the set of holes, wherein the set of holes are set apart at 45 degrees from an adjacent hole;
a plurality of holes on the telescoping arm, wherein the plurality of holes is in line and traverse through to a plurality of holes on an opposite side such that a pin can traverse through from one side to the opposite side;
a perpendicularly set receiver piece on the telescoping arm, wherein the receiver piece is integrated to an end opposite an end that connects to the fixed arm, wherein the receiver piece can connect to the accessories; and
wherein the telescoping arm can be rotated within the fixed arm and the set of holes in the fixed arm can be aligned with a hole in the telescoping arm to rotate and set an angle of the receiver piece at 45 degree increments.

12. The header assembly of claim 10, wherein two or more arms of the one or more arms can be moved simultaneously by connecting an accessory piece to two or more arms, the accessory piece is chosen from a list comprising:
a circular accessory piece having a plurality of evenly spaced holes around a circumference of the circular accessory piece;
a half circle accessory piece configured as a half circle and having a plurality of evenly spaced holes;
a quarter circular piece configured as a quarter circle and having a plurality of evenly spaced holes; and
wherein the accessory piece is attached to two or more of the fixed arms and the respective two or more arm connectors, wherein the two or more fixed arms are connected to by aligning two or more holes of the plurality of evenly spaced holes on the accessory piece with the hole in the two or more fixed arms and inserting the plunger-type fastener through the aligned holes and openings.

13. A header assembly for mounting accessories, the header assembly comprising:
   a center column having a first end and a second end, wherein the first end has a cross sectional shape configured to receive a junior pin, and wherein the second end has a cross sectional shape configured to connect into a junior pin receiver or to receive a baby pin;
   a locking plate integrated around the center column proximal to the first end, wherein the locking plate has a plurality of grooves configured around a circumference on a side of the locking plate facing toward the second end;
   a securing plate removably positioned around the center column proximal to the second end, and whereby the locking plate and the securing plate are spaced apart creating a space;
   one or more arm mounting cylinders removably positioned on the center column in the space between the locking plate and the securing plate, wherein the one or more arm mounting cylinders are secured into position by moving the securing plate against the one or more arm mounting cylinders, wherein each of the one or more arm mounting cylinders has a cylindrical shape and includes:
      a panel perpendicularly set onto a perimeter of the cylindrical shape, wherein the panel has a length and a width; and
      an arm connector integrated into the panel to extend perpendicularly away from the panel, and wherein the arm connector has a tubular shape with an opening that traverses through the arm connector; and
   whereby each of the one or more arm mounting cylinders is configured to connect to one or more arms configured to mount to the accessories or whereby the one or more arm mounting cylinders can directly connect with an accessory.

14. The header assembly of claim 13, wherein an interior of the center column includes a threaded section at a relative midline of the center column, wherein the threaded section has ⅜-16 inch threads.

15. The header assembly of claim 13, wherein each of the one or more arm mounting cylinders is sandwiched between bearings, whereby each of the one or more arm mounting cylinders rotate independently of each other.

16. The header assembly of claim 13, wherein each of the one or more arm mounting cylinders has an opening in a center corresponding with a cross-sectional shape and size of a space on the center column.

17. The header assembly of claim 13, wherein at least three configurations of the one or more arm mounting cylinders comprises:
   a first arm mounting cylinder wherein the panel is set onto the perimeter of the cylindrical shape along an inside edge of the panel wherein an entire length of the panel extends in one direction from where it is set onto the cylindrical shape;
   a second arm mounting cylinder, wherein a length of the panel is the same as the length of the panel on the first arm mounting cylinder, wherein the panel on the second arm mounting cylinder is set off center onto the perimeter of the cylindrical shape wherein the length of the panel extends in both directions from where the panel is set onto the cylindrical shape, with one direction having a longer length of the panel; and
   a third arm mounting cylinder wherein the panel has a length that is longer than the length of the panel of the first and second arm mounting cylinders, and wherein the panel on the third mounting cylinder is set onto the perimeter of the cylindrical shape along an inside edge of the panel wherein an entire length of the panel extends in one direction from where it is set onto the cylindrical shape.

18. The header assembly of claim 13, wherein the one or more arm mounting cylinders are stacked onto the center column such that the arm connectors on each arm mounting cylinder extends perpendicularly away from the center column, and wherein the arm connectors are all arranged on a similar level plane.

19. The header assembly of claim 13, wherein the one or more arms connect to an arm connector of the one or more arm connectors on one of the one or more arm mounting cylinders, wherein each of the one or more arms includes a fixed arm, a telescoping arm which slidingly fits within the fixed arm, and a connector piece that fixedly connects the fixed arm and the telescoping arm, whereby the telescoping arm can extend, retract, or rotate within the fixed arm by loosening the connector piece.

20. The header assembly of claim 19, wherein an opening traverses through the fixed arm at a position proximal to a first end of the fixed arm, wherein the first end of the fixed arm is fitted over the arm connector and the opening in the fixed arm aligns with the opening in the arm connector, wherein:
   a plunger-type fastener is threaded through the openings in the fixed arm and the arm connector and a plunger tip on the plunger-type fastener is inserted into a groove in the plurality of grooves in the locking plate to lock the one or more arms into place; and
   wherein the plunger-type fastener can be moved out of the groove in the locking plate such that the fixed arm is unlocked and can rotate around the center column.

21. The header assembly of claim 19, wherein the one or more arms further comprises:
   a set of holes located proximally to a second end of the fixed arm, wherein each hole of the set of holes are opposite each other such that a pin can traverse through the set of holes, wherein the set of holes are set apart at 45 degrees from an adjacent hole;
   a plurality of holes on the telescoping arm, wherein the plurality of holes is in line and traverse through to a plurality of holes on an opposite side such that a pin can traverse through from one side to the opposite side;
   a perpendicularly set receiver piece on the telescoping arm, wherein the receiver piece is integrated to an end opposite an end that connects to the fixed arm, wherein the receiver piece can connect to the accessories; and
   wherein the telescoping arm can be rotated within the fixed arm and the set of holes in the fixed arm can be aligned with a hole of the plurality of holes in the telescoping arm to rotate and set an angle of the receiver piece at 45 degree increments.

22. The header assembly of claim 20, wherein two or more arms of the one or more arms can be moved simultaneously by connecting an accessory piece to two or more arms, the accessory piece is chosen from a list comprising:

a circular accessory piece having a plurality of evenly spaced holes around a circumference of the circular accessory piece;

a half circle accessory piece configured as a half circle and having a plurality of evenly spaced holes;

a quarter circular piece configured as a quarter circle and having a plurality of evenly spaced holes; and wherein the accessory piece is attached to two or more of the fixed arms and the respective two or more arm connectors the two or more fixed arms are connected to by aligning two or more holes of the plurality of evenly spaced holes on the accessory piece with the hole in the two or more fixed arms and inserting the plunger-type fastener through the aligned holes and openings.

* * * * *